US010599402B2

(12) United States Patent
Landowski et al.

(10) Patent No.: US 10,599,402 B2
(45) Date of Patent: Mar. 24, 2020

(54) TECHNIQUES TO CONFIGURE A WEB-BASED APPLICATION FOR BOT CONFIGURATION

(71) Applicant: Facebook, Inc., Menlo Park, CA (US)

(72) Inventors: Laurent Nicolas Landowski, Emerald Hills, CA (US); Kemal El Moujahid, Mountain View, CA (US); Stepan Parunashvili, San Francisco, CA (US); Willy Blandin, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/648,488

(22) Filed: Jul. 13, 2017

(65) Prior Publication Data

US 2019/0018657 A1    Jan. 17, 2019

(51) Int. Cl.
*G06F 8/34* (2018.01)
*H04L 29/08* (2006.01)
*G06F 8/60* (2018.01)
*G06F 8/20* (2018.01)
*H04L 29/06* (2006.01)
*H04W 12/02* (2009.01)

(52) U.S. Cl.
CPC ............ *G06F 8/34* (2013.01); *G06F 8/20* (2013.01); *G06F 8/60* (2013.01); *H04L 67/02* (2013.01); *H04L 63/08* (2013.01); *H04W 12/02* (2013.01)

(58) Field of Classification Search
CPC ..... G06F 8/34; G06F 8/20; G06F 8/60; H04L 67/02; H04L 63/08

USPC ........................................................ 717/109
See application file for complete search history.

(56) References Cited

U.S. PATENT DOCUMENTS

| 6,978,447 | B1* | 12/2005 | Okmianski | G06F 9/45508 717/139 |
| 7,752,554 | B2* | 7/2010 | Biggs | H04L 63/0245 715/751 |
| 8,280,993 | B2* | 10/2012 | Awadallah | H04L 63/1441 709/202 |
| 8,751,633 | B2* | 6/2014 | Holloway | G06Q 30/0241 709/224 |
| 10,417,347 | B2* | 9/2019 | Schlesinger | G10L 15/22 |

(Continued)

OTHER PUBLICATIONS

Beschastnikh et al., "Accelerating software engineering research adoption with Analysis Bots", 2017, IEEE/ACM (Year: 2017).*

(Continued)

*Primary Examiner* — Wei Y Zhen
*Assistant Examiner* — Junchun Wu

(57) ABSTRACT

Techniques to configure a web-based application for bot configuration are described. In one embodiment, an apparatus may comprise a web application hosting component operative to receive a bot-configuration request from a web client, the bot-configuration request corresponding to a developer account for a bot system; and provide a web-based application to the web client; and a web-application preparation component operative to prepare the web-based application for the web client, the web-based application comprising a simulated user environment interface, a code development interface, and a natural-language-processing log interface, wherein the simulated user environment interface corresponds to a user interface for the bot system. Other embodiments are described and claimed.

20 Claims, 10 Drawing Sheets

(56) References Cited

U.S. PATENT DOCUMENTS

| | | | | |
|---|---|---|---|---|
| 10,491,548 B2* | 11/2019 | Xie | ......................... | H04L 51/02 |
| 2004/0205114 A1* | 10/2004 | Kinoshita | ............. | G06F 16/951 |
| | | | | 709/202 |
| 2007/0041528 A1* | 2/2007 | Menon | .................... | H04L 29/06 |
| | | | | 379/90.01 |
| 2008/0092058 A1* | 4/2008 | Afergan | ................ | H04L 67/303 |
| | | | | 715/745 |
| 2011/0307860 A1* | 12/2011 | Park | .......................... | G06F 8/30 |
| | | | | 717/107 |
| 2012/0016862 A1* | 1/2012 | Rajan | .................. | G06F 11/3684 |
| | | | | 707/710 |
| 2012/0204264 A1* | 8/2012 | Jiang | ....................... | H04L 41/12 |
| | | | | 726/23 |
| 2013/0124185 A1* | 5/2013 | Sarr | ...................... | G06F 17/289 |
| | | | | 704/2 |
| 2014/0149963 A1* | 5/2014 | Jang | ........................ | G06F 8/34 |
| | | | | 717/107 |
| 2016/0012374 A1* | 1/2016 | Roman | .......... | G06Q 10/06312 |
| | | | | 705/7.14 |
| 2016/0092160 A1* | 3/2016 | Graff | .................. | G01C 21/3641 |
| | | | | 704/257 |
| 2017/0286269 A1* | 10/2017 | Furman | ............... | G06F 11/3664 |
| 2017/0293681 A1* | 10/2017 | Blandin | .................. | H04L 51/02 |
| 2017/0357638 A1* | 12/2017 | Schlesinger | ............ | G06F 17/28 |
| 2017/0366479 A1* | 12/2017 | Ladha | .................... | H04L 51/02 |
| 2018/0025085 A1* | 1/2018 | Sarangi | ................. | G06F 3/0482 |
| | | | | 707/722 |
| 2018/0107461 A1* | 4/2018 | Balasubramanian | ..... | G06F 8/35 |
| 2018/0302346 A1* | 10/2018 | Xie | ....................... | H04L 51/063 |
| 2018/0321922 A1* | 11/2018 | Balasubramanian | ... | H04L 51/02 |
| 2018/0332042 A1* | 11/2018 | Yu | ...................... | H04L 63/0884 |

OTHER PUBLICATIONS

Chen et al., "AxsJAX: A Talking Translation Bot Using Google IM", Apr. 2008, ACM (Year: 2008).*

Rieder, "Studying Facebook via Data Extraction: The Netvizz Application", May 2013, ACM (Year: 2013).*

Klopfenstein et al., "The Rise of Bots: A Survey of Conversational Interfaces, Patterns, and Paradigms", Jun. 2107, ACM (Year: 2017).*

* cited by examiner

500

```
┌─────────────────────────────────────────────┐
│ Receive a bot-configuration request from a  │
│ web client, the bot-configuration request   │
│ corresponding to a developer account for a  │
│ bot system.                                 │
│                    502                      │
└─────────────────────────────────────────────┘
                      │
┌─────────────────────────────────────────────┐
│ Prepare a web-based application for the web │
│ client, the web-based application           │
│ comprising a simulated user environment     │
│ interface, a code development interface,    │
│ and a natural-language-processing log       │
│ interface, wherein the simulated user       │
│ environment interface corresponds to a user │
│ interface for the bot system.               │
│                    504                      │
└─────────────────────────────────────────────┘
                      │
┌─────────────────────────────────────────────┐
│ Provide the web-based application to the    │
│ web client.                                 │
│                    506                      │
└─────────────────────────────────────────────┘
```

TECHNIQUES TO CONFIGURE A WEB-BASED APPLICATION FOR BOT CONFIGURATION

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to configure a web-based application for bot configuration. Some embodiments are particularly directed to techniques configure a web-based application for bot configuration in which a code development interface is displayed in conjunction with a simulated user environment interface and a natural-language-processing log interface. In one embodiment, for example, an apparatus may comprise a web application hosting component and a web-application preparation component. The web application hosting component may be operative to receive a bot-configuration request from a web client, the bot-configuration request corresponding to a developer account for a bot system, and to provide a web-based application to the web client The web-application preparation component may be operative to prepare the web-based application for the web client, the web-based application comprising a simulated user environment interface, a code development interface, and a natural-language-processing log interface, wherein the simulated user environment interface corresponds to a user interface for the bot system. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

DETAILED DESCRIPTION

Figure 1:
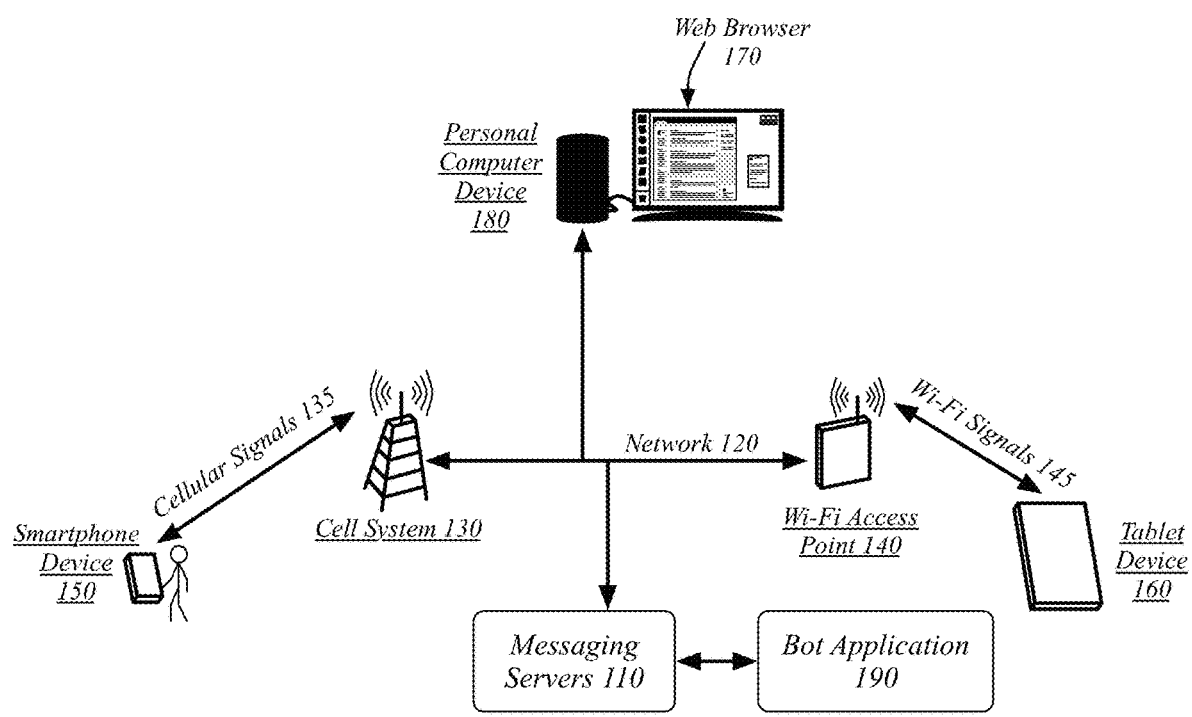
FIG. 1 illustrates an embodiment of a system.

To aid a user in interacting with a service via a messaging context, services may be represented as messaging bots within a messaging system. A messaging bot may be an automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users.

As such, a user may engage with network services within the familiar experience of a messaging client. Further, by using a messaging client, a user may engage with network services within a messaging context so as to allow the inclusion of other people. In some cases, this may simply inform the other people as to the services, such as letting friends or family know about transportation details. In other cases, this may empower the performance of services for multiple people, such as where dinner, a ride, entertainment, or other service is arranged for the use of multiple people. As a result, the embodiments can improve the experience of using network-accessible services and can extend the reach of network-accessible services to the user of a messaging system.

The developing of a messaging bot may be constrained by the difficulties in generating natural language processing (NLP) systems. As such, the messaging system may provide a NLP system to perform the analysis of messaging conversations and to provide NLP information relevant to the performance of a service by a messaging bot to a bot application implementing the messaging bot.

One possible approach to generating an automated bot is through the specification of rules. Imperative instructions may be provided by a developer for how an automated bot should respond to various situations. Development with rules can initially be simple: an automated bot with two rules may have very limited capability, but within its limited scope, that capability may function. However, to accommodate new situations, new functionality, or other new elements the rules are supplemented with additional rules. The chain of pre-coded reasoning becomes longer, more complicated, and therefore becomes more difficult to maintain as consistent without conflict between the rules.

Machine learning may therefore be desirable as compared to rules-based bots. However, machine learning based on a training dataset places a burden on a developer to generate or gather the training dataset. This may be possible for a larger developer with significant resources to dedicate to a single project, but impractical for a smaller developer or even for a larger developer trying to introduce a variety of services within a reasonable budget and timeframe.

A bot platform may, therefore, benefit from providing a machine learning framework that empowers developers to create machine-learning based bots using an amount of time and resources sufficiently modest as to engender a rich community of bots. A bot platform that enables developers to efficiently develop bots that can be improved over time using machine learning encourages the creation of bots and therefore the providing of services to consumers of the bot platform.

A developer may be aided by being provided a natural way to specify the structure of how a messaging bot should gather information relevant to the performance of its service. The bot platform may provide a bot engine that empowers developers to define the behavior of their bots using stories. Stories are example conversations. On top of user messages and bot messages, the stories may also contain bot actions that carry out the service provided by a bot. The stories may also be annotated with examples of the information that a bot should be extracting from user messages, thereby teaching the bots what to learn and how.

A developer may be empowered to configure an information-gathering process by providing annotated example conversations between a hypothetical user and the messaging bot that illustrate how the information gathering process could work. The developer may write a plurality of example conversations, where each conversation represents a scenario for the messaging bot. These example conversations may be annotated to illustrate, for each message received from a user, what information the messaging bot should extract to build the context for a requested service. The example conversations may build to an application program interface (API) call to a bot application, where the API call uses the context built through the example conversation.

While the messaging interactions of a bot may be modeled using example conversations, the API calls to the bot application may still rely on the programming of bot code to enact the API calls to the bot application. The performance of tasks specific to a particular bot application may rely on custom coding of tasks for the bot application. However, some elements of the development of bot code may be standardized for multiple bots and multiple developers, across the bot system. For example, authenticating a bot application with a bot system, communicating with the bot system, identifying users of the bot system, and managing sessions with users of the bot system, may all be substantially similar across different developed bot applications for the bot system. As such, a developer may benefit from only having to code the bot code that pertains to the bot API calls that are specific to the bot application. The surrounding functionality may be supported according to libraries provided by the bot system.

Further, the developer may be aided by the bot system providing a development environment designed around the implementation and testing concerns specific to bot development. A web-based application may be provided by the bot system that provides a bot development and testing interface hosted within the web client. The web-based application provides an interface for writing the bot code, an interface for simulating a user interaction with the bot, and a logging interface showing the processing being done on the simulated user interaction. The bot application executes in a server component of the web client, thereby empowering a developer to conveniently host their own test server. This web-based application may still interact with cloud services where the bot application would, such as to interact with an NLP system portion of the bot system to receive NLP processing services. The web-based application may further empower the transfer of the developed bot to a server host system for production use of the bot application once development is complete. The web-based application may use libraries and code management in order to focus developer time and resources on developing bot-specific functionality, encapsulating general bot functions on behalf of the developer. As a result, the embodiments can improve the affordability and practicality of bot development for bot developers.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a =5, then a complete set of components 122 illustrated as components 122-1 through 122-a may include components 122-1, 122-2, 122-3, 122-4 and 122-5. The embodiments are not limited in this context.

FIG. 1 illustrates a block diagram for a web-based bot design system 100.

A bot application 190, possibly of a plurality of bot applications, may operate within a network environment including a messaging system empowering the exchange of messages and other information. The bot application 190 may comprise a software application executing on a computer system. The bot application 190 may use a messaging system to exchange messages comprising user messages and bot messages. User messages may comprise user requests and messages clarifying and specifying user requests. Bot messages may clarify requests for information relating to user requests and performance information relating to user requests. In some cases, the messaging system may comprise a general messaging system also used for other messages. In other cases, the messaging system may comprise a messaging system exclusive to communicating with bot applications.

The messaging servers 110 may comprise one or more messaging servers operated by a messaging system as part of the web-based bot design system 100. A messaging server may comprise an Internet-accessible server, with the network 120 connecting the various devices of the web-based bot design system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging system including the messaging servers 110. A dedicated messaging client may be a general client operative to work with a plurality of different messaging providers including the messaging provider administering the messaging system including the messaging servers 110. A messaging client may empower access to bot applications for the performance of services, such as where the bot applications are one of a plurality of endpoints and/or services accessible via the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a social networking service, with the computing device providing additional functionality of the social networking service. Similarly, a social networking application may provide both messaging functionality and additional functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. Messaging applications on different devices may comprise installations of the same application on both devices. Messaging applications on different devices may comprise smartphone-specific and tablet-specific versions of a common application. Messaging applications on different devices may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a inbox, a deletion of a message from a inbox, and a read receipt.

A web-based bot design system 100 may operate by defining a messaging inbox as comprising a plurality of messages, wherein each message is an individual transaction of communication between two or more participants. A messaging server may operate by maintaining a message index for the messaging inbox. Messaging servers may receive messages and store the messages in message archives from which messages may be retrieved through reference to the message index. Messaging clients may connect to the messaging servers and retrieve messages that have been added to their message archive since their last update. The messaging clients may receive a message index from the message archive indicating what messages are stored in the message archive. The messaging clients may compare the message archive to their current inbox in order to determine what messages they are missing, which they then request from the message archive. The messaging clients may make changes to their inbox, which results in message inbox instructions being transmitted to the message archives instructing the message archives in modifications to make to the representation of their message inbox on the message archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members. A message thread may be between, for instance, a user and a messaging bot, wherein the user accesses the message thread to engage in messaging with the messaging bot in order to submit requests and engage in a dialog regarding requests.

The web-based bot design system 100 may use knowledge generated from interactions in between users. The web-based bot design system 100 may comprise a component of a social-networking system and may use knowledge generated from the broader interactions of the social-networking system. As such, to protect the privacy of the users of the web-based bot design system 100 and the larger social-networking system, web-based bot design system 100 may include an authorization server (or other suitable component(s)) that allows users to opt in to or opt out of having their actions logged by the web-based bot design system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the web-based bot design system 100 and other elements of a social-networking system through blocking, data hashing, anonymization, or other suitable techniques as appropriate.

Figure 2:
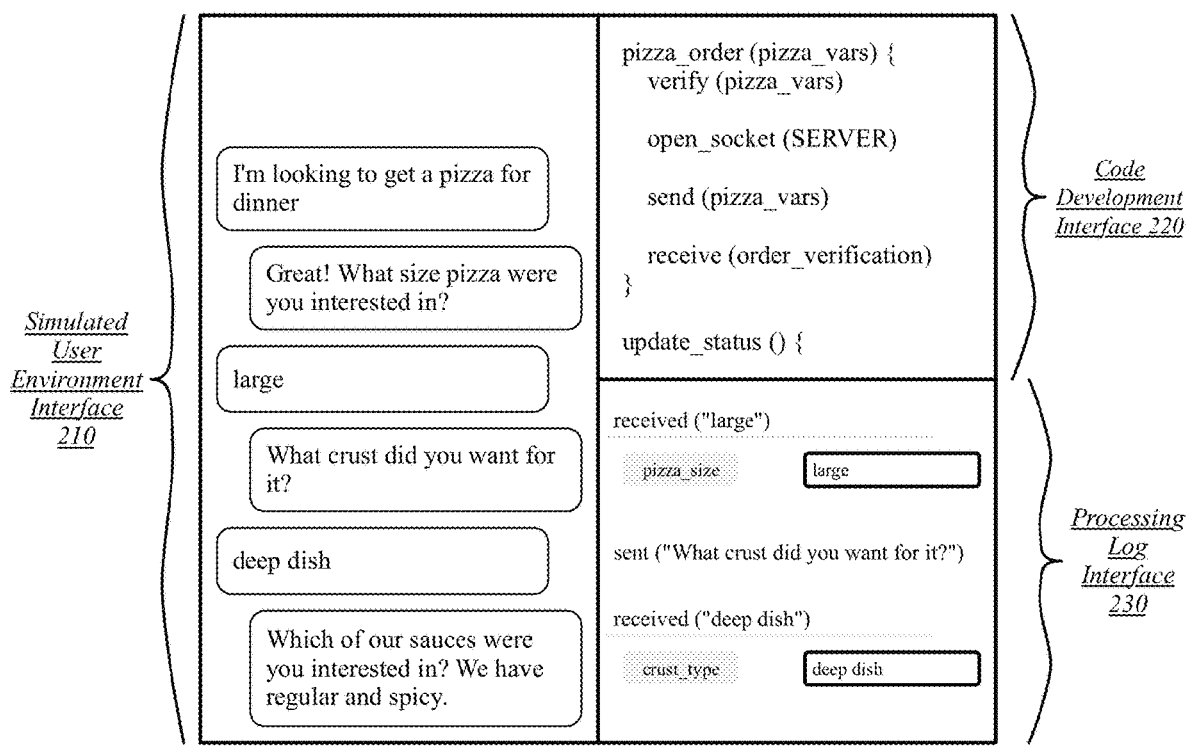
FIG. 2 illustrates an embodiment of a user interface for a development interface.

FIG. 2 illustrates an embodiment of a user interface 200 for a development interface for a web-based application.

A user interface 200 may be displayed on a client device. The client device may correspond to, without limitation, a smartphone device 150, a personal computer device 180, a tablet device 160, or any other form of client device. The user interface 200 may be displayed via a web browser, such as may execute on a smartphone device 150, tablet device 160, personal computer device 180, or other device. The user interface 200 may comprise a development interface for a web-based application for the design and configuration of a bot application 190. In some embodiments, a development interface may be displayed in a web browser accessing a web site for the web-based bot design system 100, with the development interface hosted by the web-based bot design system 100 and executing as a web-based application on the client device.

A development interface may include a code development interface 220, the code development interface 220 empowering the entering, the viewing, the modification, and generally-speaking the composition of bot code for a bot application 190. The code development interface 220 is a portion of the development interface dedicated to code development. The code development interface 220 may be displayed alongside and therefore in conjunction with other development interfaces.

A development interface may include a simulated user environment interface 210. The simulated user environment interface 210 presents a testing environment for a bot application 190, in which the code provided in the code development interface 220 can be tested using a server hosted within the web-based application and the actual NLP services of the bot system.

A simulated user environment interface 210 may correspond to a message interaction display. A message interaction display may comprise a series of messages exchanged between the user of the web-based application and an automated bot implemented by the bot application 190. A message interaction display may include a user message of a plurality of user messages. A message interaction display may include a bot message of a plurality of bot messages. The message interaction display may, in some cases, only visibly include a portion of the user messages and bot messages, such as due to limited screen space of the client device and the portion of the screen devoted to the simulated user environment interface 210.

The developer may interact with the simulated user environment interface 210 to enter user messages to be processed by the bot application 190. These user messages are responded to with bot messages based on the bot code of the code development interface 220 and the NLP services of the bot system. This simulated user environment interface 210 may therefore empower a developer to test the actual user experience of interacting with a bot application 190.

A development interface may include a processing log interface 230. A processing log interface 230 presents logging information reflecting the natural language processing performed in the performance of the bot application 190 being developed. The processing log interface 230 presents NLP information communicating the processing of the NLP services provided by the bot system. The processing log interface 230 may present the natural language being processed, which may include user messages entered by the developer using the simulated user environment interface 210. The processing log interface 230 may present extracted terms, inferred terms, inferred intentions, or any other conclusions reached based on the natural language processing. The processing log interface 230 may present the assignment of values to variables based on the natural language processing. For example, a "crus_type" variable may be set to "deep dish" based on the natural language processing of a statement inferred to be reflecting a choice of crust type for a pizza-ordering bot application. The processing log interface 230 may present the NLP information that is being presented to the developer's bot code, which NLP information will be processed according to the bot code entered in the code development interface 220.

Figure 3:
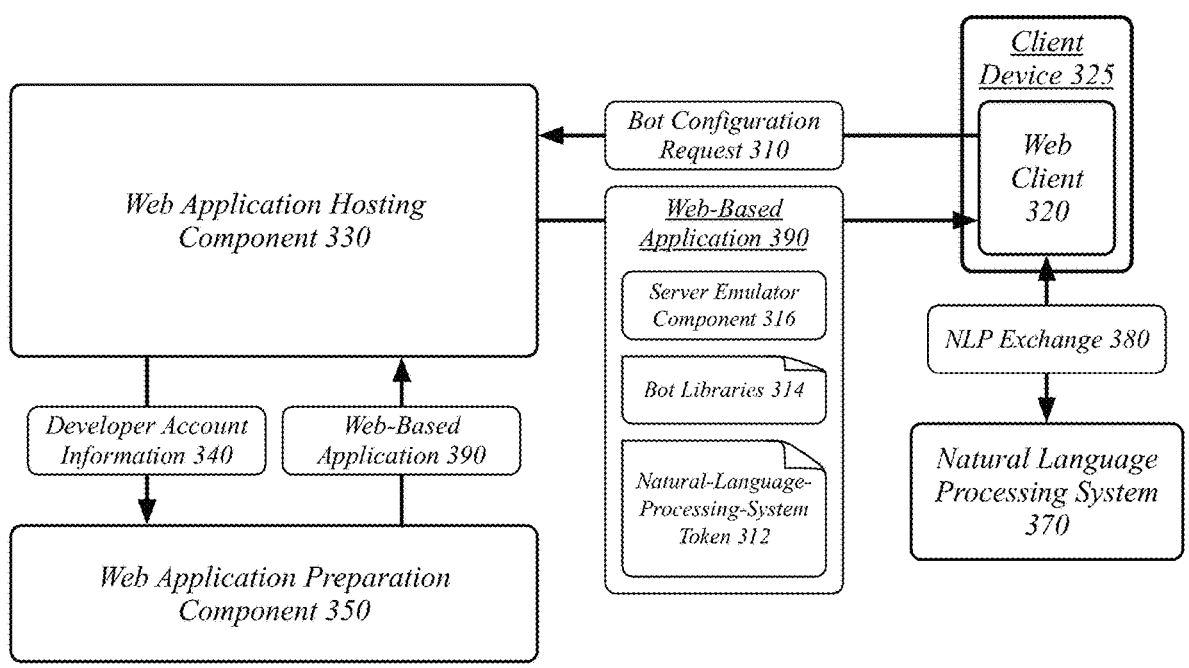
FIG. 3 illustrates an embodiment of a web-based bot design system configuring a web-based application based on a bot configuration request.

FIG. 3 illustrates an embodiment of a web-based bot design system 100 configuring a web-based application based on a bot configuration request 210.

The web-based bot design system 100 may comprise a computer-implemented system having software applications comprising one or more components. Although the web-based bot design system 100 shown in FIG. 3 has a limited number of elements in a certain topology, it may be appreciated that the web-based bot design system 100 may include more or less elements in alternate topologies as desired for a given implementation.

The web-based bot design system 100 may include one or more components operative to prepare, provide, and assist in developer use and management of a web-based application 390 providing bot development tools in a bot development environment. The web-based bot design system 100 may comprise a web application hosting component 330 and a web application preparation component 350, without limitation.

The web application hosting component 330 is generally arranged to host a web-based application 390 for one or more client devices. The web-based application 390 empowers development of bots for use with a bot system. The web-based application 390 may specifically empower development of messaging bots for use with a messaging system. The web application hosting component 330 may use known techniques to serve a web-based application 390 to a web client 320, such as may include the use of client-side executable code.

The web application hosting component 330 receives a bot-configuration request 310 from a web client 320. The web client 320 may comprise a web browser application executing on a client device 325. The client device 325 may comprise any type of client device, such as a smartphone device 150, tablet device 160, or personal computer device 180. The web client 320 may comprise a web browser 170 on a personal computer device 180.

The web application hosting component 330 may authenticate the web client 320 for use with the web-based bot design system 100. The web application hosting component 330 may authenticate the web client 320 to a developer account for a bot system, the developer account registered with the bot system to receive bot development support and access for a bot application 190 or a plurality of bot applications to the bot system. As such, the bot-configuration request 310 may correspond to a developer account for the bot system.

The bot configuration request 310 may specify a bot registered to the developer account to be configured by the web-based application 390. Alternatively, the specific bot to be developed may be specified after the web-based application 390 is provided to the web client 320.

The web-based bot design system 100 further comprises a web application preparation component 350. The web application preparation component 350 is generally arranged to prepare the web-based application 390 for the web client 320. The web-based application 390 comprises a simulated user environment interface, a code development interface, and a natural-language-processing log interface. The web application hosting component 330 then provides the web-based application 390 to the web client 320 in response to the bot configuration request 310.

The simulated user environment interface corresponds to a user interface for the bot system, such that the simulated user environment interface presents a simulation of the user environment used to interact with the bot. Where the bot is a messaging bot used with a messaging system, the simulated user environment interface corresponds to a messaging interface empowering messaging interaction with the messaging bot being developed using the web-based application 390. The simulated user environment interface empowers the developer to enter and receive messages, with entered messages processed by the messaging bot and responded to with the messages that are then received by the developer in the simulated user environment interface.

The code development interface empowers the reviewing, entry, modification, and, in general, development of bot code for a bot. The bot code may implement functions to carry out tasks for the bot. A bot may use a natural language processing (NLP) system 370 to aid in the performance of bot. The NLP system 370 may perform NLP analysis to interpret the natural-language statements made by a user and to determine the natural-language statements made by the bot. During development of the bot using the web-based application 310, the web client 320 may interact with the NLP system 370 in an NLP exchange 380. The NLP exchange 380 may comprise the web-based application 390 providing natural-language statements (e.g., the providing of information, the asking of questions) entered by the developer using the simulated user environment interface. The NLP exchange 380 may comprise the web-based application 390 receiving API calls to bot functions defined in the bot code of the code development interface from the NLP system 370. In some embodiments, the interpretation of natural language and generation of natural language may use example conversations provided by the developer, such as may be entered using a web-based example-specification application, which may or may not be the same as the web-based application 390 used for the development of bot code.

The bot code development in the code development interface may comprise the specification of one or more functions to carry out specific tasks for the performance of the bot. When a bot is executed in conjunction with a bot system, the NLP system 370 may gather information for the performance of a specific task, and then initiate the performance of that task by making an application programming interface (API) call to a bot function specified in the code development interface. In some embodiments, the web-based bot design system 100 may prepare the one or more bot functions for development in the code development interface based on the bot API calls specified in an example-interaction repository for the bot. The example-interaction repository may comprise example bot interactions prepared by a developer of the bot. The example bot interactions may include API calls to bot functions, indicating the structure (e.g., input variables) of the bot functions, but lacking the code-based implementation of the bot functions.

The web-application preparation component 350 may therefore prepare the code development interface by prefilling the bot code with undefined functions for the bot functions extracted from the example-interaction repository. The web-application preparation component 350 may determine one or more bot functions referenced by an example-interaction repository for a bot and prepare the web-based application to present the one or more bot functions as undefined functions in the code development interface.

The web-application preparation component 350 may therefore prepare the code development interface with templated versions of the one or more bot functions so as to ease the bot code development for the developer.

The natural-language-processing log interface empowers the viewing of a log for the natural-language processing performed by the NLP system 370. The log may be specifically generated by the NLP system 370 for display to the developer in the NLP log interface, and may be provided as part of the NLP exchange 380. The NLP log interface may display a log communicating in a human-readable form a summary of the NLP exchange 380 and the NLP processing of the NLP processing system 370. The NLP log interface may be configured to display log information indicating the matching of user statements to example user statements from the example-interaction repository, the extraction of information from user statements, the assignment of values to variables based on information extracted from user statements, the selection of natural-language bot statements for display by the bot, or any other NLP task.

The web-based application 390 may include a server emulator component 316. A server emulator component 316 empowers the deployment of the bot code developed in the code development interface to an executable environment that supports the execution of the bot application. The executable environment is provided by the server emulator component 316 for use in testing the bot code without the deployment of the bot code to a server device. Once the bot code has been tested, it can be deployed to a server device ready to use in the performance of a bot. As such, the simulated user environment interface reflects the processing done by the server emulator component 316 to execute the bot code. The simulated user environment interface is operative to display a simulated bot interaction based on the code development interface providing the bot code to the server emulator component.

The web-based application 390 may comprise bot libraries 314 used to implement a portion of the functionality of a bot application. The bot libraries 314 may provide functions for one or more of user identifier handling, messaging system authentication, messaging system communication, and messaging session management.

A business may be represented as a social-networking page, with the social-networking page identified with a social-networking page identifier uniquely identifying the business and its page with the social-networking system. The page may have a messaging identity, such that the page is enabled to be messaged with by users of a messaging system. Pages with a message identity may additionally have a messaging identifier associated with them, uniquely identifying the page as a message recipient with the messaging system. Pages may alternatively or additionally have one or more bot applications associated with them. Each bot application has a unique bot identifier identifying the bot. The bot identifier is associated with the page identifier to associate the bot with the page. In some embodiments, the bot identifier may also be used to identify the bot for messaging. In other embodiments, each bot may have a distinct bot identifier used to identify the bot for messaging. A message thread may be associated with a thread identifier, the thread identifier uniquely identifying the message thread with the messaging system. A bot may be authorized, such as a temporary authorization, to access a message thread through an association, which may also be temporary, between the bot identifier and the message thread identifier. The bot libraries 314 may provide support for handling of any of these identifiers, such as managing a bot identifier for the bot application, a page identifier for an associated page, one or more thread identifiers for threads the bot interacts with, or any other identifiers used for performance of bot operations.

The bot libraries 314 may provide support for messaging system authentication so as to authorize a bot application to access the bot system. For instance, the bot application may be configured with a secure token operative to authenticate the bot application to use the bot system. The secure token may be specifically linked to the bot identifier for the bot application so as to specifically authorize the particular bot application being configured by the developer to use the bot system.

The bot libraries 314 may provide support for messaging system communication. The bot libraries 314 may provide support for the submission of messages to a messaging system, the receipt of messages from a messaging system, the tracking of whether a submitted messages has been received and/or viewed by a receiving user, and other messaging system communication tasks. The bot libraries 314 may provide reliable message delivery for the bot application using the messaging system. The bot libraries 314 may handle addressing of recipient users, as may use messaging identifiers for one or more recipient users and/or may use thread identifier for message threads with the one or more recipient users.

The bot libraries 314 may provide support for messaging session management. The bot libraries 314 may provide support for opening a session with a user, such as may be initiated by the bot application or may be initiated by the user. The bot libraries 314 may maintain a record of each ongoing session, so as to make the history of each session available to the bot application. The bot libraries 314 may maintain various data structures on behalf of the developer bot code as part of the operations of the bot application, the data structures storing session-specific information, such as information specifying a configuration of service or product being requested by a user communicating with the bot application.

The bot libraries 314 may include a bot hosting emulation library. The web-based application is operative to emulate a bot hosting environment using the bot hosting emulation library. The bot hosting emulation library comprises functions for one or more of user identifier handling, messaging system authentication, messaging system communication, and messaging session management. The bot hosting emulation library comprises functions for performing one or more of user identifier handling, messaging system authentication, messaging system communication, and messaging session management in an emulated bot hosting environment that executes within the web client 320, such as by using client-side executable code, to present an execution environment that emulates a deployment to a server environment, thereby empowering client-side development without the use of a developer testing server.

Web-based access to a bot application being developed can be provided to users other than the primary developer. A developer can retrieve a uniform resource locator (URL) from the web-based application 390 that empower access to the in-development bot application. In some cases, the URL may provide full access to the bot being developed. In other cases, the URL may provide controlled access, such that the bot may be viewed and tested, such as by using the simulated user environment interface, without being able to reconfigure the operations of the bot application. The web-based application 390 is operative to generate a URL for a bot application for the developer account, receive a bot-view request from a viewing web client using the URL, and prepare a web-based bot access application for the viewing web client in response to receiving the bot-view request using the uniform resource locator. The web-based bot access application is provided to the viewing web client and empowers the viewing web client to access a testing environment for the bot application. The testing environment may comprise a simulated user interface environment that uses the bot code developed in the code development interface, but without empowering the user of the web-based bot access application to modify the bot code.

Figure 4:
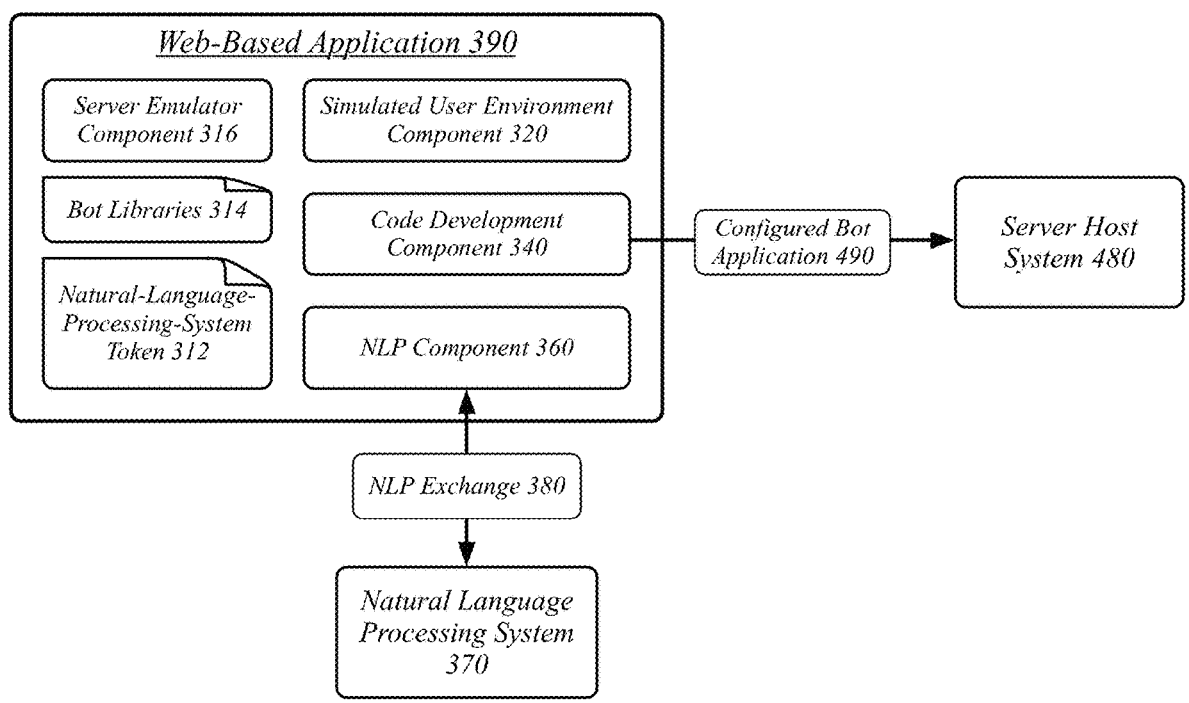
FIG. 4 illustrates an embodiment of a web-based bot design system configuring a server host system with a configured bot application.

FIG. 4 illustrates an embodiment of a web-based bot design system 100 configuring a server host system 490 with a configured bot application 490.

The web-based application 390 is operative to generate a configured bot application 490 for deployment to a server host system 480. A configured bot application 490 is configured for use with a bot system, such that the bot application is operative to communicate with users of the bot system, to perform an NLP exchange 380 with a NLP system 370 for the bot system, and to generally operate with the bot system.

The web-based application 390 may comprise a deployment control. A deployment control is operative to activate the web-based application to transfer bot code from the code development interface to a server host system. The development control empowers a user to deploy the bot application by transitioning the developed bot application from the client side web-based application 390 to a server host system 480.

The web-based application 390 may comprise a bot hosting library when deployed as a configured bot application 490. The bot hosting library may comprise functions for one or more of user identifier handling, messaging system authentication, messaging system communication, and messaging session management. The web-based application is operative to deploy bot code entered into the code development interface to a server host system using the bot hosting library. The bot code may be deployed within an executable using the functions of the bot hosting library to execute on the server host system 480 and interact with the boy system.

The web-based application 390 may include both a bot hosting emulation library and a bot hosting library. The bot hosting emulation library provides execution support while the bot application is in development and executing client-side on the web client 420. The bot hosting library provides execution support once the bot application is deployed to the server host system 480. The bot hosting emulation library and the bot hosting library may implement the same or similar functions using distinct techniques as appropriate to execution within a web client 320 as compared to execution on a server host system 480. The web-based application 390 is operative to transition bot code from using the bot hosting emulation library to using the bot hosting library in response to a transfer of bot code from the code development interface to a server host system.

The web application preparation component 350 preparing the web-based application for the web client 320 may comprise providing an natural-language-processing-system access token to the web-based application. A natural-language-processing (NLP) system may provide NLP services to bot applications. For example, user-entered text sequences, corresponding to user responses to bot messages, may be analyzed by an NLP system 370. The web-based application 390 may be configured by the web application preparation component 350 to use the natural-language-processing-system access token to authorize the bot application to access the NLP system 370. The web-based application 390 is then further operative to configure the bot application to access the NLP system 370, such as through operations implemented in the bot libraries 314. The web-based application 390 is operative to configure the bot application to operate based on processing results from the NLP system 370.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive a bot-configuration request from a web client, the bot-configuration request corresponding to a developer account for a bot system at block 502.

The logic flow 500 may prepare a web-based application for the web client, the web-based application comprising a simulated user environment interface, a code development interface, and a natural-language-processing log interface, wherein the simulated user environment interface corresponds to a user interface for the bot system at block 504.

The logic flow 500 may provide the web-based application to the web client at block 506.

The embodiments are not limited to this example.

Figure 6:
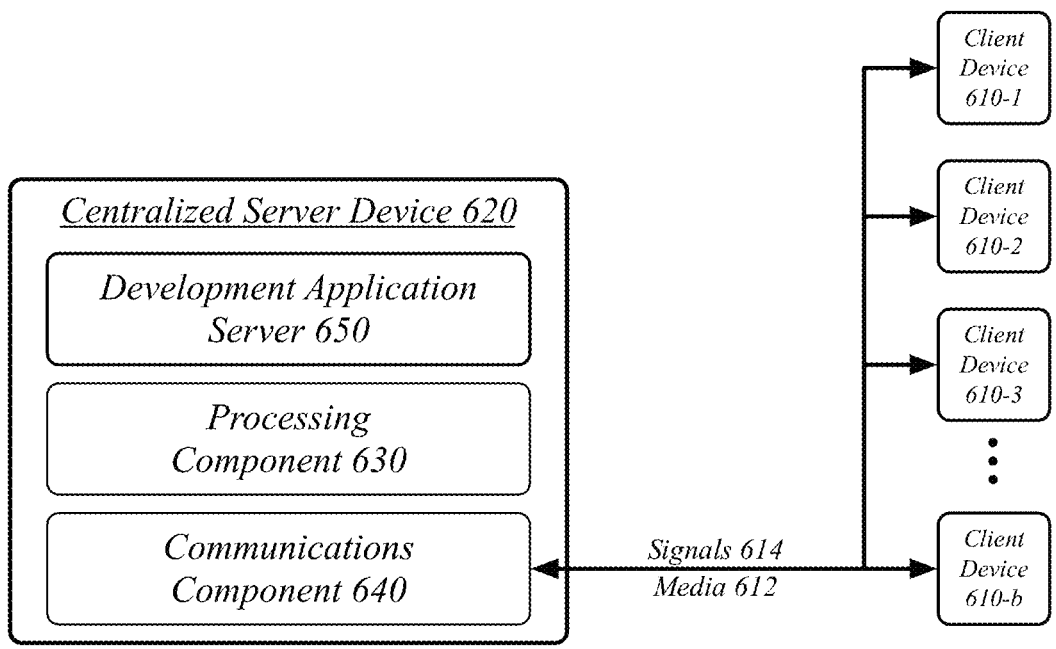
FIG. 6 illustrates an embodiment of a centralized system for the system of FIG. 1.

FIG. 6 illustrates a block diagram of a centralized system 600. The centralized system 600 may implement some or all of the structure and/or operations for the bot design system 100 in a single computing entity, such as entirely within a single centralized server device 620.

The centralized server device 620 may comprise any electronic device capable of receiving, processing, and sending information for the bot design system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 620 may execute processing operations or logic for the bot design system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 620 may execute communications operations or logic for the bot design system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 620 may communicate with other devices over a communications media 612 using communications signals 614 via the communications component 640. The devices may be internal or external to the centralized server device 620 as desired for a given implementation.

The centralized server device 620 may execute a development application server 650. The development application server 650 may comprise a development application server of a plurality of development application servers for a bot design system 100. The development application server 650 may provide development support for bot developers. The development application server 650 may execute a web application hosting component 330 and a web application preparation component 330. The development application server 650 may support operations for a plurality of client devices 610. The client devices 610 may correspond to one or more of a smartphone device 150, tablet device 160, personal computer device 170, and/or any other client device.

Figure 7:
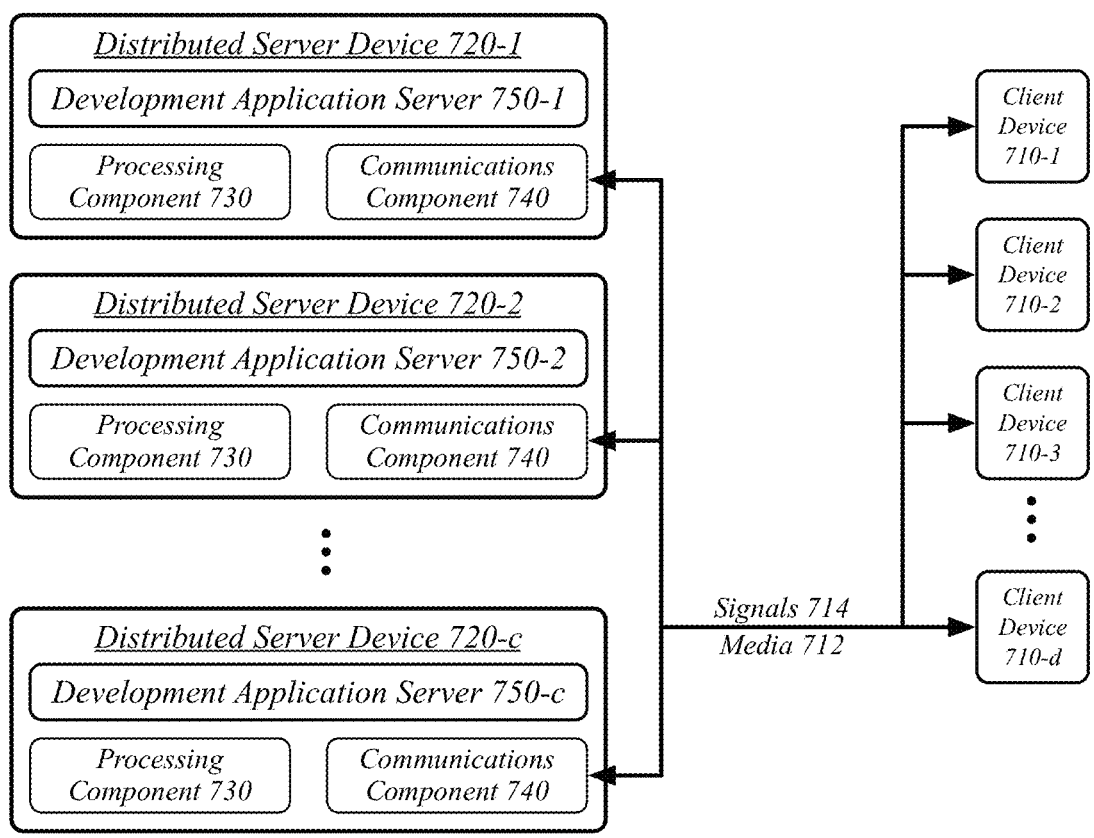
FIG. 7 illustrates an embodiment of a distributed system for the system of FIG. 1.

FIG. 7 illustrates a block diagram of a distributed system 700. The distributed system 700 may distribute portions of the structure and/or operations for the bot design system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of distributed server devices 720. In general, the distributed server devices 720 may be the same or similar to the centralized server device 620 as described with reference to FIG. 6. For instance, the distributed server devices 720 may each comprise a processing component 730 and a communications component 740 which are the same or similar to the processing component 630 and the communications component 640, respectively, as described with reference to FIG. 6. In another example, the distributed server devices 720 may communicate over a communications media 712 using communications signals 714 via the communications components 740.

The distributed server devices 720 may comprise or employ one or more server programs that operate to perform various methodologies in accordance with the described embodiments. In one embodiment, for example, the distributed server devices 720 may each execute a development application server 750. The development application servers 750 may provide development support for bot developers. The development application servers 750 may execute a web application hosting component 330 and a web application preparation component 330. The development application servers 750 may support operations for a plurality of client devices 610. The client devices 610 may correspond to one or more of a smartphone device 150, tablet device 160, personal computer device 170, and/or any other client device.

Figure 8:
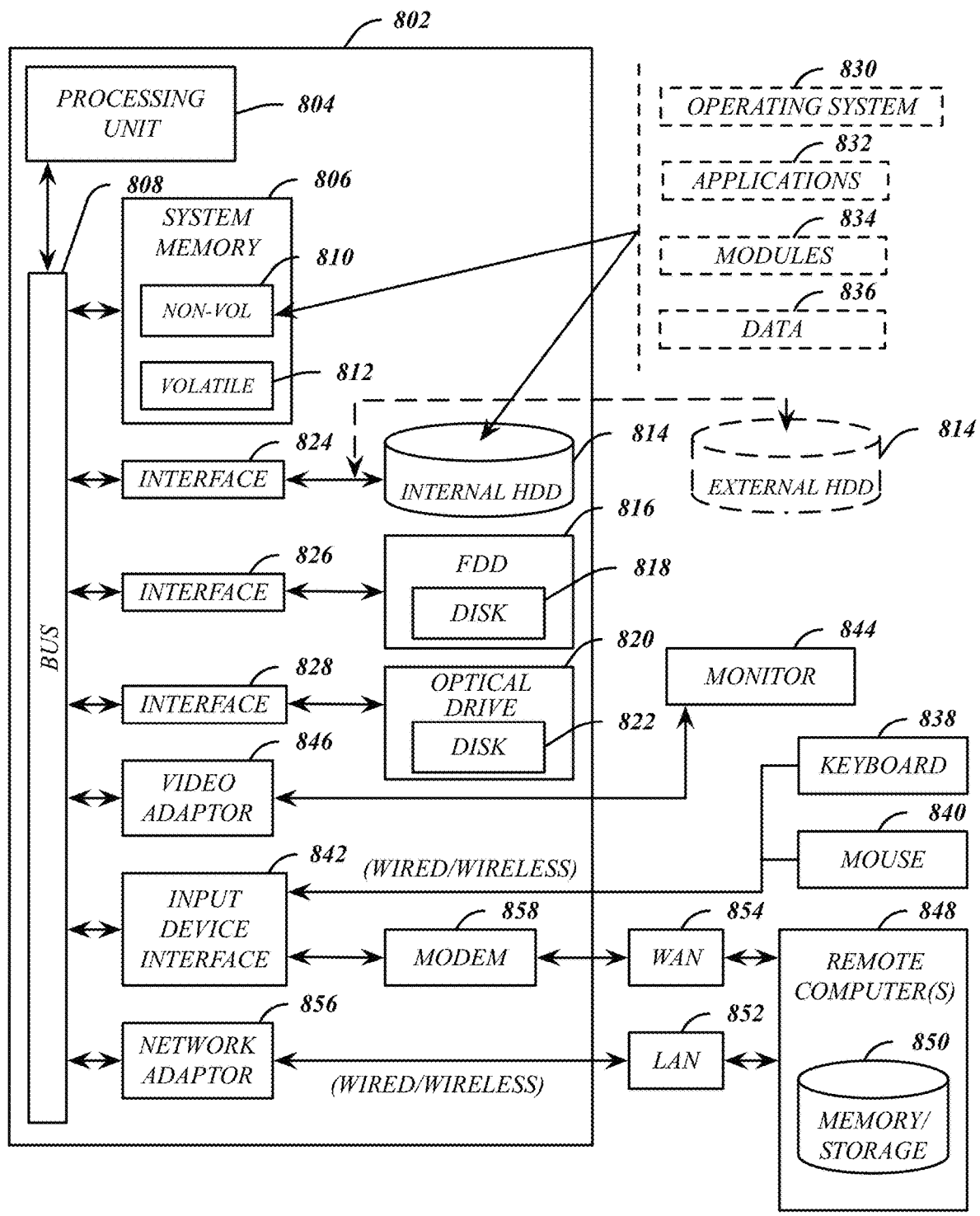
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the web-based bot design system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
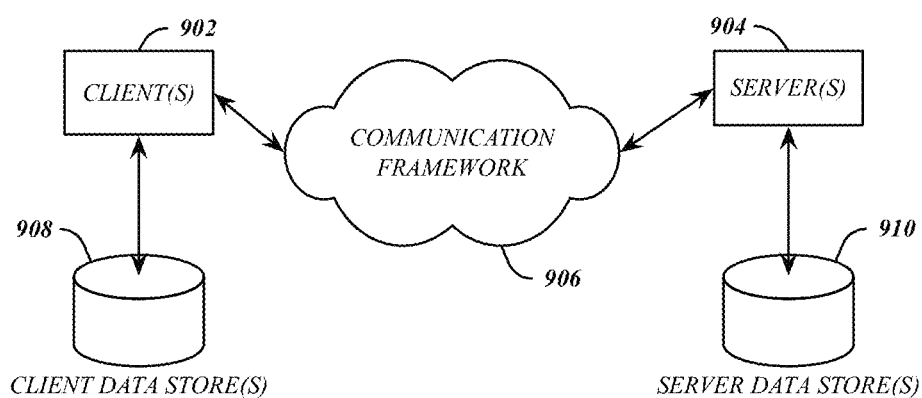
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement various messaging client and/or web clients. The servers 904 may implement various servers, such as one or more development application servers. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications networks types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
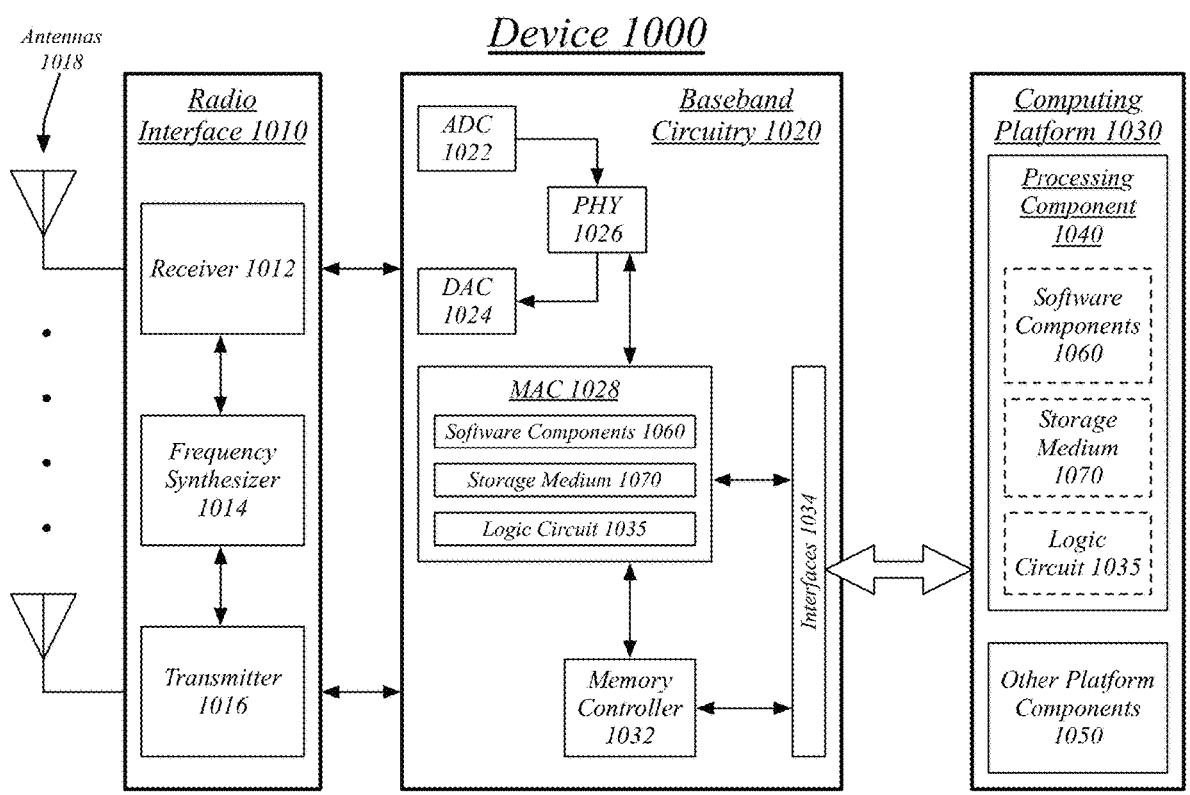
FIG. 10 illustrates an embodiment of a radio device architecture.

FIG. 10 illustrates an embodiment of a device 1000 for use in a multicarrier OFDM system, such as the web-based bot design system 100. Device 1000 may implement, for example, software components 1060 as described with reference to web-based bot design system 100 and/or a logic circuit 1035. The logic circuit 1035 may include physical circuits to perform operations described for the web-based bot design system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the web-based bot design system 100 and/or logic circuit 1035 in a single computing entity, such as entirely within a single device. Alternatively, the device 1000 may distribute portions of the structure and/or operations for the web-based bot design system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the web-based bot design system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a bot-configuration request from a web client, the bot-configuration request corresponding to a developer account for a bot system; preparing a web-based application for the web client, the web-based application comprising a simulated user environment interface, a code development interface, and a natural-language-processing log interface, wherein the simulated user environment interface corresponds to a user interface for the bot system; providing the web-based application to the web client.

A computer-implemented method may further comprise the web-based application comprising a server emulator component, the simulated user environment interface operative to display a simulated bot interaction based on the code development interface providing bot code to the server emulator component.

A computer-implemented method may further comprise the web-based application comprising a bot hosting emulation library, the web-based application operative to emulate a bot hosting environment using the bot hosting emulation library, the bot hosting emulation library comprising functions for one or more of user identifier handling, messaging system authentication, messaging system communication, and messaging session management.

A computer-implemented method may further comprise the web-based application comprising a deployment control, the deployment control operative to activate the web-based application to transfer bot code from the code development interface to a server host system.

A computer-implemented method may further comprise the web-based application comprising a bot hosting library, the web-based application operative to deploy bot code entered into the code development interface to a server host system using the bot hosting library, the bot hosting library comprising functions for one or more of user identifier handling, messaging system authentication, messaging system communication, and messaging session management.

A computer-implemented method may further comprise the web-based application comprising a bot hosting emulation library and a bot hosting library, the web-based application operative to transition bot code from using the bot hosting emulation library to using the bot hosting library in response to a transfer of bot code from the code development interface to a server host system.

A computer-implemented method may further comprise wherein preparing the web-based application for the web client comprises providing an natural-language-processing-system access token to the web-based application.

A computer-implemented method may further comprise determining one or more bot functions referenced by an example-interaction repository for a bot; and preparing the web-based application to present the one or more bot functions as undefined functions in the code development interface.

A computer-implemented method may further comprise generating a uniform resource locator for a bot application for the developer account; receiving a bot-view request from a viewing web client using the uniform resource locator; and preparing a web-based bot access application for the viewing web client in response to receiving the bot-view request using the uniform resource locator.

An apparatus may comprise a web application hosting component operative to receive a bot-configuration request from a web client, the bot-configuration request corresponding to a developer account for a bot system; and provide a web-based application to the web client; and a web-application preparation component operative to prepare the web-based application for the web client, the web-based application comprising a simulated user environment interface, a code development interface, and a natural-language-processing log interface, wherein the simulated user environment interface corresponds to a user interface for the bot system. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving, from a client device, a request for preparation of a web-based bot development application, the request corresponding to a developer account for a bot system;
   retrieving one or more example bot interactions from an example-interaction repository;
   determining one or more bot functions referenced by the example bot interactions;
   configuring the web application to present the one or more bot functions in a code development interface of the web-based bot development application; and
   providing access to the web-based bot development application by a web client on the client device;
   the web-based bot development application comprising:
      a simulated user environment interface showing an interactive user interface for a bot;
      the code development interface in which bot code may be displayed and edited; and
      a natural-language-processing log interface reflecting the natural language processing performed in the performance of the bot.

2. The method of claim 1, the web-based application comprising a server emulator component, the simulated user environment interface operative to display a simulated bot interaction based on the code development interface providing bot code to the server emulator component.

3. The method of claim 1, the web-based application comprising a deployment control, the deployment control operative to activate the web-based application to transfer bot code from the code development interface to a server host system.

4. The method of claim 1, the web-based application comprising a bot hosting library, the web-based application operative to deploy bot code entered into the code development interface to a server host system using the bot hosting library, the bot hosting library comprising functions for one or more of user identifier handling, messaging system authentication, messaging system communication, and messaging session management.

5. The method of claim 1, wherein preparing the web-based application for the web client comprises providing a natural-language-processing-system access token to the web-based application.

6. The method of claim 1, further comprising:
   determining one or more bot functions referenced by an example-interaction repository for a bot; and
   preparing the web-based application to present the one or more bot functions as undefined functions in the code development interface.

7. The method of claim 1, further comprising:
   generating a uniform resource locator for a bot application for the developer account;
   receiving a bot-view request from a viewing web client using the uniform resource locator; and
   preparing a web-based bot access application for the viewing web client in response to receiving the bot-view request using the uniform resource locator.

8. An apparatus, comprising: a processor; a web application hosting component operative on the processor to: receive, from a client device, a request for preparation of a web-based bot development application, the request corresponding to a developer account for a bot system; and provide access to a web-based bot development application by a web client on the client device; and a web-application preparation component operative on the processor to: retrieve one or more example bot interactions from an example-interaction repository; determine one or more bot functions referenced by the example bot interactions; and configure the web application to present the one or more bot functions in a code development interface of the web-based bot development application; the web- based bot development application comprising: a simulated user environment interface showing an interactive user interface for a bot; the code development interface in which bot code may be displayed and edited; and a natural-language-processing log interface reflecting the natural language processing performed in the performance of the bot.

9. The apparatus of claim 8, the web-based application comprising a server emulator component, the simulated user environment interface operative on the processor to display a simulated bot interaction based on the code development interface providing bot code to the server emulator component.

10. The apparatus of claim 8, the web-based application comprising a deployment control, the deployment control operative on the processor to activate the web-based application to transfer bot code from the code development interface to a server host system.

11. The apparatus of claim 8, the web-based application comprising a bot hosting library, the web-based application operative on the processor to deploy bot code entered into the code development interface to a server host system using the bot hosting library, the bot hosting library comprising functions for one or more of user identifier handling, messaging system authentication, messaging system communication, and messaging session management.

12. The apparatus of claim 8, wherein preparing the web-based application for the web client comprises providing a natural-language-processing-system access token to the web-based application.

13. The apparatus of claim 8, further comprising:
the web application preparation component operative on the processor to determine one or more bot functions referenced by an example-interaction repository for a bot; and prepare the web-based application to present the one or more bot functions as undefined functions in the code development interface.

14. At least one non-transitory computer-readable storage medium comprising instructions that, when executed, cause a system to:
receive, from a client device, a request for preparation of a web-based bot development application, the request corresponding to a developer account for a bot system;
retrieve one or more example bot interactions from an example-interaction repository;
determine one or more bot functions referenced by the example bot interactions;
configure the web application to present the one or more bot functions in a code development interface of the web-based bot development application; and
provide access to the web-based bot development application by a web client on the client device;
the web-based bot development application comprising:
a simulated user environment interface showing an interactive user interface for a bot,
the code development interface in which bot code may be displayed and edited, and
a natural-language-processing log interface reflecting the natural language processing performed in the performance of the bot.

15. The non-transitory computer-readable storage medium of claim 14, the web-based application comprising a server emulator component, the simulated user environment interface operative to display a simulated bot interaction based on the code development interface providing bot code to the server emulator component.

16. The non-transitory computer-readable storage medium of claim 14, the web-based application comprising a deployment control, the deployment control operative to activate the web-based application to transfer bot code from the code development interface to a server host system.

17. The non-transitory computer-readable storage medium of claim 14, the web-based application comprising a bot hosting library, the web-based application operative to deploy bot code entered into the code development interface to a server host system using the bot hosting library, the bot hosting library comprising functions for one or more of user identifier handling, messaging system authentication, messaging system communication, and messaging session management.

18. The non-transitory computer-readable storage medium of claim 14, wherein preparing the web-based application for the web client comprises providing a natural-language-processing-system access token to the web-based application.

19. The non-transitory computer-readable storage medium of claim 14, comprising further instructions that, when executed, cause a system to:
determine one or more bot functions referenced by an example-interaction repository for a bot; and
prepare the web-based application to present the one or more bot functions as undefined functions in the code development interface.

20. The non-transitory computer-readable storage medium of claim 14, comprising further instructions that, when executed, cause a system to:
generate a uniform resource locator for a bot application for the developer account;
receive a bot-view request from a viewing web client using the uniform resource locator; and
prepare a web-based bot access application for the viewing web client in response to receiving the bot-view request using the uniform resource locator.

\* \* \* \* \*